United States Patent [19]

Brook et al.

[11] Patent Number: 5,536,310
[45] Date of Patent: Jul. 16, 1996

[54] CEMENTITIOUS COMPOSITIONS CONTAINING FLY ASH

[75] Inventors: John W. Brook, Mantua; David F. Factor, Hiram; Frederick D. Kinney, Broadview Hts. all of Ohio; Celeste L. McCallen, Wexford, Pa.; Andrea M. Young, Redondo Beach, Calif.

[73] Assignee: Sandoz Ltd., Basel, Switzerland

[21] Appl. No.: 320,846

[22] Filed: Oct. 6, 1994

Related U.S. Application Data

[63] Continuation of Ser. No. 58,103, May 6, 1993, abandoned, which is a continuation-in-part of Ser. No. 55,612, Apr. 30, 1993, abandoned, which is a continuation-in-part of Ser. No. 10,681, Jan. 28, 1993, abandoned, which is a continuation of Ser. No. 800,786, Nov. 27, 1991, abandoned.

[30] Foreign Application Priority Data

Nov. 18, 1992 [CH] Switzerland ............... 3538/92

[51] Int. Cl.$^6$ .................................. C04B 14/04
[52] U.S. Cl. .................. 106/708; 106/692; 106/705; 106/709; 106/713; 106/717; 106/719; 106/724; 106/802; 106/823; 106/DIG. 1; 264/DIG. 49; 524/650
[58] Field of Search ................... 106/692, 705, 106/708, 713, 717, 724, 728, 739, 764, 819, 823, DIG. 1, 709, 719, 802; 264/DIG. 49; 524/650

[56] References Cited

U.S. PATENT DOCUMENTS

| | | | |
|---|---|---|---|
| 4,125,160 | 11/1978 | Crinkelmeyer et al. | 106/717 |
| 4,210,457 | 7/1980 | Dodson et al. | 106/97 |
| 4,306,912 | 12/1981 | Forss | 106/724 |
| 4,313,763 | 2/1982 | Turpin | 106/88 |
| 4,318,744 | 3/1982 | Dodson | 106/708 |
| 4,514,228 | 4/1985 | Gouvenot | 106/98 |
| 4,640,715 | 2/1987 | Heitzmann et al. | 106/85 |
| 4,642,137 | 2/1987 | Heitzmann et al. | 106/85 |
| 4,842,649 | 6/1989 | Heitzmann et al. | 106/89 |
| 4,961,790 | 10/1990 | Smith et al. | 106/809 |
| 4,997,484 | 5/1991 | Gravitt et al. | 106/708 |

FOREIGN PATENT DOCUMENTS

| | | |
|---|---|---|
| 2020267 | 11/1979 | United Kingdom . |
| WO9212103 | 7/1992 | WIPO . |
| WO9212100 | 7/1992 | WIPO . |

OTHER PUBLICATIONS

M. V. Malhotra, *Fly Ash, Silica Fume, Slag and Natural Pozzolans in Concrete*, Proceedings Fourth Canmet International Conference, Istanbul, Turkey, May 1992, M. Tokyay et al., Mineralogical Investigations of High–Lime Fly Ashes, vol. 1, pp. 65–73.

Chemical Abstracts, vol. 115, No. 16, Abstract No. 165247s (1991).

Chemical Abstracts, vol. 103, No. 8, Abstract No. 58252v (1985).

*Primary Examiner*—Mark L. Bell
*Assistant Examiner*—Michael Marcheschi
*Attorney, Agent, or Firm*—Robert S. Honor; Carl W. Battle; Carol A. Loeschorn

[57] ABSTRACT

A cementitious composition comprising
(A) 10–30 parts cementitious material;
(B) 50–80 parts fly ash weight; and
(C) 1.5–8 parts hydroxycarboxylic acid and/or salt thereof.

20 Claims, No Drawings

CEMENTITIOUS COMPOSITIONS CONTAINING FLY ASH this is a continuation of application Ser. No. 08/058,103, filed May 6, 1993, now abandoned which in turn is a continuation-in-part of application Ser. No. 08/055,612, filed Apr. 30, 1993, which in turn is a continuation-in-part of application Ser. No. 08/010,681, filed Jan. 28, 1993, which in turn is a continuation of application Ser. No. 07/800,786, filed Nov. 27, 1991, the latter three of which are now abandoned.

This invention relates to cementitious compositions and more particularly to cementitious compositions containing fly ash.

Fly ash is defined in Standard Specification C 618 of the American Society for Testing and Materials (ASTM) as "finely divided residue that results from the combustion of ground or powdered coal". ASTM C 618 (the contents of which are incorporated herein by reference) defines two distinct types of fly ash, Class F and Class C, the former (obtained from the combustion of anthracite or bituminous coal) being more common than the latter (obtained from the combustion of subbituminous coal or lignite). One characterizing feature of Class C fly ash is its higher calcium-containing material content, expressed as lime content, and stated by ASTM C 618 to be often "higher than 10%".

The use of fly ash in cementitious compositions confers useful properties such as enhanced final strength and durability and reduced permeability, and it has been widely used in, for example, concrete. However, it also confers low early strength (disadvantageous in many applications) and it retards the set time.

It has now been found, surprisingly, that the combination of a cementitious material, a fly ash and a particular type of admixture can give a cementitious composition which enjoys virtually all of the advantages of having fly ash incorporated therein, but without most, and sometimes all of the disadvantages. There is therefore provided, according to the present invention, a cementitious composition comprising, per 100 parts by weight, components A), B) and C), as follows, (A) 10–30 parts cementitious material;

(B) 50–80 parts fly ash; and (C) 1.5–8 parts, expressed as free acid, of hydroxycarboxylic acid or salt thereof.

By "cementitious material" is meant a material which comprises a hydraulic cement, that is, a calcium aluminosilicate which when mixed with water will set to form a hard product. The most common type of such material is Portland cement, and for the purposes of this invention this is the preferred cementitious material. However, high alumina cement may also be used. Also, granulated blast furnace slag cement and slag/portland cement blends may be used.

The cementitious material may contain other materials which are not in themselves cementitious but which can make a contribution to the setting of final product. Examples of these are the various natural and artificial pozzolans.

The calcium oxide content of the fly ash which is used in the compositions materially influences the performance of the compositions. Desirably, the fly ash has a calcium oxide content of from 15–45%, by weight, preferably from 18–30%, by weight. However, the invention also substantially improves the strength and set performance of compositions containing fly ash of low calcium oxide content, i.e. less than 15% by weight, e.g. from 1–14.99%, typically 1.5–8%.

The preferred amounts of the two components A) and B), expressed as parts by weight per 100 parts by weight of the total of defined cementitious compositions, are 70–80 parts fly ash and 20–27 parts cementitious material. The respective more preferred percentages are 71–73% fly ash, 25–26% cementitious material.

The hydroxycarboxylic acid component (or salt thereof) may be any hydroxy-bearing carboxylic acid having one or more carboxylic acid moieties, e.g. may be a mono-, di- or tri-carboxylic acid compound of which its elements preferably consist of carbon, hydrogen and oxygen. Among the more suitable such acids are citric, malic, malonic, glycolic and glyoxylic acids. Citric acid is especially preferred, and is conveniently used in tri-alkali metal salt form. Hydroxycarboxylic acids are well-known in the cement art as retarders. However, the use of the higher minimum amounts of such acids in the higher fly ash/cement ratio compositions of the invention results in the acids having an activating effect which increases both early strength and set time. The preferred amount of the hydroxycarboxylic acid or salts thereof (Component C) is generally in the range of 2–7 parts per 100 parts of composition, more preferably 2.3 to 7 parts. The particular amount employed may be influenced by the calcium oxide content of the fly ash with lesser amounts being often used with the higher calcium oxide contents. Hence, from 2–5 parts of component C per 100 parts of composition are typically used when the calcium oxide content is 15–45% by weight and typically 4–7 parts of component C is used when the calcium oxide content is less than 15% by weight.

Preferred alkali metal salts of hydroxycarboxylic acid employed as component (C) are tripotassium and trisodium citrate, and mixtures thereof.

To the essential components of the above-defined cementitious compositions of the invention other ingredients may be added for various purposes. For example, materials functioning as retarders in the compositions may be added to control the high increase in the rate of set experienced in composition prepared with fly ash having the higher calcium oxide contents, e.g. 15–45%. Suitable such retarders include compounds providing borate ions. A preferred retarder is borax. The retarders are added in amounts effective to achieve the desired retardation. Such amounts, e.g. of borate ion sources, range from 0.5 to 6.0% by weight for each 100. parts by weight of the cementitious compositions (components A, B and C), more usually 1.0 to 5%. The greater amounts of retarder are generally used with the higher calcium oxide contents as particularly provided by the fly ash.

Conventional anti-shrinkage agents may be also added, preferably an alkali metal or alkaline earth metal sulfate. Such agents are typically added in an amount of from 0.5 to 6% by weight for each 100 parts by weight of the cementitious compositions (components A, B and C), more usually in an amount of 1.0 to 5.0% by weight.

Conventional superplasticizers may also be added to improve flowability of the compositions and are mainly useful with compositions prepared from fly ash having the lower calcium oxide contents, e.g. less than 15% by weight calcium oxide. The Superplasticizer is typically added in an amount of 0.5 to 4% by weight for each 100 parts by weight of the indicated cementitious compositions, more usually 1–3% by weight. Preferred superplasticizers include the well-known calcium naphthalene sulfonates.

It is also generally desirable to adjust as may be indicated the pH of the cementitious compositions to within the range typical of cement compositions, e.g. pH 12 to 13.5, more typically pH 12.5–13. Compositions prepared from the higher calcium oxide content fly ashes generally need little or no adjustment. Hence, it is generally desirable to add a base, particularly an alkali metal hydroxide, particularly sodium or potassium hydroxide, to compositions prepared from the lower calcium oxide content fly ashes, particularly those with less than 15% by weight calcium oxide content. Typically, the amount of base added to adjust the pH will range from 0.5 to 4% by weight per 100 parts of the cementitious compositions.

Other materials which may be added include minerals such as non-hydraulic glassy silicates, silica fume, rice hull ash, precipitated silica and the like. Fibers suitable for use in the construction industry may also be added.

The cementitious compositions optionally modified as disclosed herein or in conventional ways may be used in a variety of ways typical in the cement industry. Such compositions may, for example, be used with the addition of little or no sand as pastes and grouts or the usual amounts of sand or sand and aggregate may be added for use as mortars and concrete. Water is added to commence the hydraulic process in usual amounts ranging from 5 to 35% by weight of the cementitious composition (components A, B and C) depending mainly upon use and desired fluidity, usually from 6 to 25% by weight and more usually 7 to 20% by weight.

The invention is further described with reference to the following examples in which all parts are expressed by weight. The Class C fly ash in. examples 1–6 has a calcium oxide content of about 20–22%.

EXAMPLE 1

A high performance mortar is made by mixing the following materials:

| | |
|---|---|
| Portland cement | 10.4 parts |
| Class C fly ash | 28.0 parts |
| tripotassium citrate | 1.6 parts |
| fine sand | 60.0 parts |

Water is added to the extent of 8.3% by weight of the total composition.
Test results are as follows:

| | |
|---|---|
| % flow (5 drops) (ASTM C 230): | 80 |
| Set Time (ASTM C 266) initial: | 3.5 min. |
| final: | 5.0 min. |
| Compressive strength (ASTM C 109) (2" (5 cm) cube, air cured) | |
| 2 hr.: | 33.5 MPa |
| 24 hr.: | 65.0 MPa |
| day: | 85.0 MPa |

EXAMPLE 2

A high performance mortar is made by mixing the following materials:

| | |
|---|---|
| Portland Cement | 8.6 parts |
| Class C fly ash | 24.8 parts |
| tripotassium citrate | 1.0 parts |
| borax | 3.4 parts |
| sodium sulphate | 5.2 parts |
| fine sand | 57.0 parts |

Water is added to the extent of 8.3% by weight of the total composition and the text results are as follows (measured as described in Example 1)

| | |
|---|---|
| % flow | 70% |
| Set time; initial: | 28 min. |
| final: | 30 min. |
| Compressive strength, | |
| 2 hr.: | 18.6 MPa |
| 24 hrs.: | 51.0 MPa |
| 7 day: | 71.0 MPa |

EXAMPLE 3

This rapid strength repair mortar was developed from the binder of invention. The mortar consisted of 37% of binder, and 63% of sand. The weight percentage of each component in total mortar formula is shown below:

24.8% of Class C fly ash
8.7% of type II portland cement
1.0% of potassium citrate
1.0% of borax
1.5% of sodium sulfate
63% of sand The amount of water added was 9% of the total weight of the powdered materials.
The performance data are as follows:
Setting Time(ASTM C266); @22° C.+/−1° (72° F.+/−2°)
Initial: 14–21 minutes
Final: 20–36 minutes
Compressive Strength, (ASTM C109) MPa(PSI)

| | @10° C. (50° F.) | 21° C. (70° F.) | 32° C. (90° F.) |
|---|---|---|---|
| 2 hour | 9 (1300) | 17 (2400) | 18 (2600) |
| 24 hour | 33 (4800) | 43 (6300) | 45 (6500) |
| 7 day | 50 (7200) | 59 (8500) | 62 (9000) |
| 28 day | 62 (9000) | 69 (10,000) | 69 (10,000) |

EXAMPLE 4

This is the same as Example 3, except that the amount of borax was increased to 1.25%. The initial and final setting time was extended to 70 minutes and 95 minutes, respectively. The ASTM C109 test showed that the repair mortar had compressive strength of 13.5 MPa (1960 PSI) at 3 hours, and 44 MPa (6400 PSI) at 1 day at ambient temperature of 21° C. (70° F.).

EXAMPLE 5

This is the grout product based on the technology of invention. The mix design of the whole formula is as follows:

57.24% of sand
24.8% of Class C fly ash
8.7% of type II portland cement
2.0% of potassium citrate
2.5% of borax
2.5% of sodium sulfate
1.5% of silica fume
0.002% of alumina powder
0.75% of Class F fly ash The flowability could vary from stiff to fluid, depending on the water content which could be varied from 8.5% to 13.0%.

The compressive strengths were 13.8 MPa (2000 PSI) –27.6 MPa (4000 PSI) at 1 day; 27.6 MPa (4000 PSI)–48.3 MPa (7000 PSI) at 7 days; and 48.3 MPa (7000 PSI)–69 MPa (10,000PSI) a t 28 days. The lower the water content, the higher the compressive strength. This grout system showed zero shrinkage based on ASTM C 1090 test.

EXAMPLE 6

This light reflective-floor product was also based on the invented technology. The white sand, white cement, and pigment was used to achieve the light reflectivity. The mix comprised:

58.3% of white sand

8% of white portland cement 22.5% of Class C fly ash

5% of titanium dioxide 1.8% of potassium citrate 1.5% of borax 0.4% of sodium carbonate 2.5% of sodium sulfate The water was added at a dosage of 9% to 9.25% of the total weight. The resulting floor product was nearly self-leveling with initial setting time of 2 hour and 30 minutes; final setting time of 3 hours. Its compressive strength was 33 MPa (4800 PSI) at 1 day and 52 MPa (7500 PSI) at 7 days at ambient temperature of 21° C. (70° F.).

EXAMPLE 7

This is an example of a binder system utilizing Class F fly ash. The binder comprised:

27% of type I portland cement 54.8% of Class F fly ash (calcium oxide content 2–3% by weight)

9.1% of sand 4.1% of potassium citrate 2.9% of sodium sulfate 1.6% of calcium naphthalene sulfonate condensate liquid The amount of water added was 23% of the weight of the binder. The system reached final setting in 35 minutes after mixing. The compressive strengths were 3.2 MPa (464 PSI) at 4 hour, 9.7 MPa (1406 PSI) at 1 day, and 23.7 MPa (3440 PSI) at 7 day.

EXAMPLE 8

Another Class F fly ash system for mortar use was prepared to contain the following.

28% Class F fly ash (calcium oxide content 2–3%)

12% Type I portland cement 1.2% potassium citrate

2% sodium hydroxide

60% silica sand.

Water was added in an amount of 16% based on the weight of the total binder system (without sand being counted). Good setting and strength properties were observed.

What is claimed is:

1. A cementitious composition consisting essentially of, per 100 parts by weight, Component A) 10–30 parts by weight cementitious materials;

Component B) 50–80 parts by weight of class F fly ash having a calcium oxide content of less than 15% by weight; and Component C) 1.5–8 parts by weight, of a hydroxy di-or tricarboxylic acid salt.

2. A composition of claim 1 which contains a retarder in an amount effective to retard the setting time of the composition.

3. A composition of claim 2 which contains an anti-shrinkage agent in an amount effective to control shrinkage of the composition.

4. A composition of claim 2 in which the retarder is an alkali metal borate present in an amount of 0.5 to 6.0% by weight for each 100 parts by total weight of components A, B and C.

5. A composition of claim 4 in which the alkali metal borate is borax.

6. A composition of claim 3 in which the anti-shrinkage agent is alkali or alkaline earth metal sulfate present in an amount of 0.5 to 6.0% by weight for each 100 parts by total weight of components A, B and C.

7. A composition of claim 1 in which the fly ash is present in an amount of from 70–80 parts by weight and in which the hydroxy di- or tricarboxylic acid salt is present in an amount of from 2 to 7 parts by weight.

8. A composition of claim 7 in which the hydroxy di- or tricarboxylic acid salt is selected from the group consisting of salts of citric acid, malic acid and mixtures thereof.

9. A composition of claim 8 in which the hydroxy di-tricarboxylic acid salt is selected from the group consisting of trisodium citrate, tripotassium citrate and mixtures thereof.

10. A composition of claim 1 in which the fly ash has a calcium oxide content of 1.5–8% by weight.

11. A composition of claim 10 which contains an anti-shrinkage agent in an amount effective to control-shrinkage of the composition.

12. A composition of claim 10 which contains a super-plasticizer in amount effective to increase the fluidity of the composition.

13. A composition of claim 1 which contains a base in an amount sufficient to give the composition a pH of from 12 to 13.5 upon dilution of the composition with water.

14. A composition of claim 12 in which the anti-shrinkage agent is alkali or alkaline earth metal sulfate present in an amount of 0.5 to 6.0% by weight for each 100 parts by total weight of components A, B and C.

15. A composition of claim 10 in which the fly ash is present in an amount of from 55–70 parts by weight and has a calcium oxide content of 1.5–8% by weight, and in which the hydroxy di- or tricarboxylic acid salt is present in an amount of from 3 to 7 parts by weight.

16. A composition of claim 15 in which the hydroxy di- or tricarboxylic acid salt is selected from the group consisting of a salt of citric acid, malic acid and mixtures thereof.

17. A composition of claim 15 in which the hydroxy di- or tricarboxylic acid salt is selected from the group consisting of trisodium citrate, tripotassium citrate and mixtures thereof.

18. A composition of claim 7 wherein the hydroxy di-tricarboxylic acid salt is present in an amount of from 4–7 parts by weight.

19. A cementitious composition consisting essentially of, per 100 parts by weight, Component A) 10–30 parts by weight cementitious material;

Component B) 50–80 parts by weight of class F fly ash having a calcium oxide content of less than 15% by Weight;

Component C) 1.5–8 parts by weight, expressed as free acid, of a hydroxy di-carboxylic acid or salt thereof; and Component D) 0.5 to 4% by weight of an alkali metal containing base.

20. A cementitious composition according to claim 19, wherein the alkali metal containing base is an alkali metal hydroxide.

* * * * *